United States Patent [19]

Funakoshi et al.

[11] Patent Number: 4,775,500

[45] Date of Patent: Oct. 4, 1988

[54] ELECTRICALLY CONDUCTIVE POLYMERIC COMPOSITE AND METHOD OF MAKING SAID COMPOSITE

[75] Inventors: Yasutomo Funakoshi, Sakai; Seishi Terakado, Nara, both of Japan

[73] Assignee: Matsushita Electric Industrial Co., Ltd., Osaka, Japan

[21] Appl. No.: 42,568

[22] Filed: Apr. 24, 1987

Related U.S. Application Data

[63] Continuation-in-part of Ser. No. 799,453, Nov. 18, 1985, abandoned.

[30] Foreign Application Priority Data

Nov. 19, 1984 [JP] Japan .................................. 59-243701

[51] Int. Cl.$^4$ ........................ B06B 11/00; H01B 1/06
[52] U.S. Cl. ..................................... 264/22; 264/105; 264/346; 264/331.11; 264/331.13; 264/331.15; 252/511; 522/71; 522/77
[58] Field of Search ................. 252/511; 264/105, 22, 264/331.11, 331.13, 331.15, 346, 347; 524/495, 496; 522/71, 77

[56] References Cited

U.S. PATENT DOCUMENTS

| | | | |
|---|---|---|---|
| 3,243,753 | 3/1966 | Kohler | 338/31 |
| 3,547,834 | 12/1970 | Oshima et al. | 252/511 |
| 3,567,607 | 3/1971 | Saunders et al. | 252/511 |
| 3,673,121 | 6/1972 | Meyer | 252/511 |
| 3,689,618 | 9/1972 | Chadwick | 264/105 |
| 3,760,495 | 9/1973 | Meyer | 29/610 |
| 3,806,558 | 4/1974 | Fischer | 252/511 |
| 3,861,029 | 1/1975 | Johannsen et al. | 29/611 |
| 3,862,056 | 1/1975 | Hartman | 252/511 |
| 3,862,057 | 1/1975 | Lindner | 252/511 |
| 3,969,124 | 7/1976 | Stewart | 264/105 |
| 3,970,504 | 7/1976 | Palmer | 252/511 |
| 4,066,576 | 1/1978 | Barp | 252/511 |
| 4,200,973 | 5/1980 | Farkas | 252/511 |
| 4,592,861 | 6/1986 | Bekele | 252/511 |

*Primary Examiner*—Josephine Barr
*Attorney, Agent, or Firm*—Wenderoth, Lind & Ponack

[57] ABSTRACT

A method of making an electrically conductive polymeric composite, comprising the steps of crosslinking a first organic binder having a functional group to carbon black having a functional group so as to form a composition, fractionizing the composition, mixing the fractionized composition with the first organic binder or a second organic binder so as to form a mixture; and annealing the mixture.

17 Claims, No Drawings

ELECTRICALLY CONDUCTIVE POLYMERIC COMPOSITE AND METHOD OF MAKING SAID COMPOSITE

This application is a continuation-in-part of now abandoned application Ser. No. 799,453, filed Nov. 18, 1985, now abandoned.

BACKGROUND OF THE INVENTION

The present invention generally relates to polymeric composites and more particularly, to a method of making an electrically conductive polymeric composite for use in an electric heating element or the like.

It is generally known that an electrically conductive polymeric composite is produced by dispersing fine powder of an electrically conductive material such as carbon black, metal powder, metal fiber, etc. in a polymeric material. Such electrically conductive polymeric composite is widely used as an antistatic material or an electric heating element. In the known electrically conductive polymeric composite used as an electric heating element, carbon powder dispersed in a polymer and the polymer are required to be maintained at a proper percentage composition and the resistance value of the composite should be stabilized for a long time. Therefore, the known electrically conductive polymeric composite has been disadvantageous in that the polymer and the carbon black are inevitably required to be examined carefully in quality so as to be combined with each other. However, even if the polymer and the carbon black are examined thoroughly in respect to the quality thereof, the carbon black is merely dispersed uniformly in the polymer based on the affinity between the polymer and the carbon black. Accordingly, when the known electrically conductive polymeric composite has been used for the long time, a transmission passage of an electric current is displaced due to the cohesion of the carbon black, etc. and thus, it is difficult to prevent variations of the resistance value. Furthermore, in the case where the known electrically conductive polymeric composite is used for a special purpose and therefore, is, for example, required to have a positive temperature coefficient of resistance, such a case may arise that a polymer which is most unsuitable for stabilizing the resistance value, for example, polyethylene should be employed. In the case of a thermoplastic having a high crystallinity such as polyethylene, since a mechanism for fixing the carbon black dispersed in the thermoplastic scarcely works owing partly to a fact that such thermoplastic has almost no functional group, it is usually inevitably necessary to perform a crosslinking process such as irradiation by electron rays, etc.

As prior art in this field, U.S. Pat. No. 3,243,753 discloses a basic technology in which a cross-linking process is not performed, while U.S. Pat. No. 3,673,121 proposes an annealing process for stabilizing the resistance value. Furthermore, U.S. Pat. No. 3,861,029 discloses a crosslinking process which is performed by irradiation with electron rays after an annealing process. If the process disclosed in the above described prior art documents are employed, it is possible to produce a stable electrically conductive polymeric composite even when polyethylene is used as its polymer. However, since the crosslinking process is performed by irradiation with electron rays at a final step in this case, it is extremely difficult to perform the crosslinking process of the prior art electrically conductive polymeric composite, thereby constituting a serious obstacle to formation of an arrangement in which a layer having another function, for example, a temperature sensitive layer is integrally formed with the prior art electrically conductive polymeric composite. Meanwhile, as disclosed in U.S. Pat. No. 4,200,973, the production of an electrically conductive polymeric composite according to prior art processes are so inconvenient that an annealing process must again be performed after the crosslinking process, thus making the process steps complicated.

SUMMARY OF THE INVENTION

Accordingly, an essential object of the present invention is to provide an electrically conductive polymeric composite and a method of making an electrically conductive polymeric composite, which can be effectively used when it is quite difficult to stabilize the resistance value of the polymeric composite as in the case where the polymeric composite has a positive temperature coefficient of resistance, with substantial elimination of the disadvantages inherent in conventional methods of this kind.

A first feature of the present invention consists in given special consideration to both functional groups of the polymer and the functional groups of the electrically conductive material constituting the electrically conductive polymeric composite together with the polymer. In the case where a polymeric material having almost no functional groups, for example, polyethylene is employed, functional groups must be introduced into the polymeric material by grafting, etc. Meanwhile, carbon black considered essentially to have functional groups is employed as the electrically conductive material. However, if the number of the functional groups of the carbon black is insufficient, it also becomes necessary to introduce functional groups into the carbon black.

A second feature of the present invention is that after the polymer having the functional groups and the carbon black having functional groups have been securely crosslinked to each other into a composition by irradiating with electron rays or by adding thereto an organic peroxide, the composition is dispersed in the polymer used for the crosslinking process or dispersed in another polymer.

A third feature of the present invention is that the composition thus obtained is, after the molding, merely annealed into the electrically conductive polymeric composite having a predetermined resistance value.

In accordance with the present invention, the production processes for producing the electrically conductive polymeric composite are remarkably simplified and the electrically conductive polymeric composite is maintained at a stable resistance value for a long time.

DETAILED DESCRIPTION OF THE INVENTION

Generally, when an electrically conductive polymeric composite is composed of a polymer such as an epoxy resin having a number of functional groups and curable through its crosslinking and carbon black having a large surface area and a number of functional groups on the surface, the electrically conductive polymeric composite has a remarkably stable resistance value. However, such composite is hard and is not flexible.

On the other hand, an electrically conductive polymeric composite which is composed of a polymer having a high crystallinity and containing no functional group and carbon black, for example, polyethylene is flexible and can be molded easily. However, since the fixing capability of carbon black is small, an electrically conductive polymeric composite produced therefrom has an unstable resistance value. In order to obviate this inconvenience, it is best to crosslink the polymer to the carbon black through irradiation of electron rays, etc. It is impossible to mold the polymeric composite after the crosslinking and the crosslinking is required to be performed up to a level leading to a drop of its crystallinity in order to stabilize the resistance value. Accordingly, in order to solve such a problem, polyethylene is inevitably required to have at least a small amount of functional groups.

Thus, the composite in which a carbon black has been fixed in the polymer cannot be molded subsequently and therefore, has little practical use. However, if a composite having carbon black fixed in the polymer can be dispersed in the moldable polymer, the composite becomes useful. Furthermore, it is possible to impart flexibility and elasticity to the composite by properly selecting the physical properties of the moldable polymer.

By employing the method of making an electrically conductive polymeric composite, according to the present invention, it becomes possible to produce an electrically conductive polymeric composite having a positive temperature coefficient of resistance without the need for irradiating electron rays onto the composite at the final step.

The carbon black employed in the present invention is composed of a graphite portion made of pure carbon and an impurity portion made of the elements of hydrogen, oxygen, sulfur, etc., most of such impurities existing as quinone groups, hydroquinone groups, phenol groups, carboxyl groups, etc., located on the surface of the carbon black so as to produce chemical properties characteristic of carbon black, i.e., high reactivity or high affinity. The types and percentages of components making up these functional groups cover a wide range so as to produce various grades of carbon black. The content of the impurity portion in commercially available carbon black ranges from 3 to 12 percent in the case of channel black and from 0.1 to 3 percent in the case of furnace black and thermal black and it is considered that the number of functional groups is proportional to the above described content.

Meanwhile, in order to more effectively activate these functional groups, a binding promoter called a "coupling agent" is usually employed. The coupling agent is especially effective for carbon black having a smaller number of functional groups. Hence, it is considered that the coupling agent is generally effective for furnace black or thermal black. Effective coupling agents include a silane series coupling agent having a hydrophilic group and titanate series and aluminum series coupling agents having both a hydrophilic group and an oleophilic group. The silane series coupling agent is broadly classified into vinyl silane and amino silane.

Binders described as the first organic binder for mixing the carbon black therewith having smaller amounts of polar groups (or no polar groups), for example, polyethylene have scant or little affinity for carbon black and, in some cases, it is not possible to sufficiently disperse the carbon black therein so as to produce a homogeneous dispersion. Furthermore, in a crosslinking reaction, these binders do not provide a sufficient crosslinking density due to decrease of the active positions necessary for a graft or crosslinking reaction between the carbon black and the binders. In order to prevent such a phenomenon, countermeasures are taken such that carboxyl group containing compounds e.g., as acrylic acid or maleic acid are grafted onto the binders or the binders are formed into a copolymer by using a polymer containing acrylic acid or maleic acid. Furthermore, the binders may be blended with a polymer containing a carboxyl group to produce a sufficient number of active or polar group for the subsequent crosslinking reaction between the functional or active groups on the carbon black and the active or polar functional groups on the binders.

Meanwhile, in the case where an ethylene-vinyl acetate copolymer, an ethylene-ethyl acrylate, or an ionomer, etc. are used as the organic binder, the carboxyl groups are already contained therein. Therefore, the need for further adding a functional group to the binder is less but the addition of functional groups to the binder is even necessary in this case to add functional groups to enhance the crosslinking effects between the carbon and the binders.

The method of making an electrically conductive polymeric composite, according to the present invention, comprises the steps of mixing carbon black with a polymer or binder and kneading the composition so as to produce an electrically conductive composition with carbon homogeneously dispersed therein. The carbon black employed is ordinarily one which is activated with a functional group, such as vinyl silane and mixed with the organic binder, which is a polymer such as high-density polyethylene having a functional group, such as acrylic acid grafted thereto. Carbon black is then fixed to the binder through the functional groups by a crosslinking procedure using organic peroxides or by irradiation using electron rays to carry out the crosslinking procedure. This electrically conductive composition is then fractionalized or pulverized by using a crusher, a mill, a grinder, etc., which fractionalization can be expedited by cooling the composition by means of refrigeration, for example. By this procedure, a powdery, electrically conductive composition is produced usually and ideally having an average particle size of not more than 200 microns.

The powdery, electrically conductive crosslinked composition is then mixed and kneaded with a second organic binder or molding composition, such as thermoplastic rubber, to produce a moldable composition the composition is molded into a predetermined shape. The moldable composition is then molded at a temperature equal to or higher than the softening temperature of the second organic binder or molding composition. The second organic binder may be the same as a first organic binder.

As a variant of the above, the moldable composition having a predetermined shape may be mounted with a pair of electrodes before being annealed as described above to produce the electrically conductive polymeric composite.

The polymeric composition used to mix with the carbon before fractionalization is preferably a polyolefin composition, such as polyethylene having a crystallinity of not less than 20 percent as determined by X-ray analysis.

In order to activate the carbon black, a silane coupling agent diluted in a solvent may be mixed with carbon black and dried so as to coat the coupling agent on the surface of the carbon black.

The carbon black occupies not more than 90 percent by weight of the electrically conductive composition (before being mixed with the molding material) and preferably 30 to 90 percent by weight of the first organic binder/carbon black mixture and most preferably 40 to 90 percent by weight of the mixture. In respect to the electrically conductive polymeric composite or the final product, the carbon black occupies 25 to 50 percent of the finally produced electrically conductive polymeric composite.

Regarding the functional groups on the carbon black and binder, the nature of these groups are not critical, it being primarily important that such groups are capable of crosslinking with each other so as to affix the carbon to the polymeric organic binder.

PREFERRED EMBODIMENTS

Hereinbelow, one preferred embodiment of the present invention will be described. This embodiment shows examples of a number of experiments which have produced remarkably striking effects. In the experiments, the functional groups of carbon black are activated by using vinyl silane acting as a coupling agent. Meanwhile, high-density polyethylene having acrylic acid grafted thereinto is employed as a polymer, so that grafting in the high-density polyethylene or between the high-density polyethylene and the carbon black at the time of the crosslinking is facilitated.

More specifically, a solution containing 0.5% of vinyl silane is added to the carbon black. Then, carbon black having a solution of vinyl silane added thereto is agitated and matured. The polyethylene having functional groups is used as a first organic binder. Thereafter, the carbon black, the polyethylene and an organic peroxide are kneaded at percentage compositions of Table 1 below at temperatures of 150° to 180° C. and at a rotational speed of 75 rpm for 10 to 15 min., whereby polymeric compositions containing the carbon black were obtained.

TABLE 1

| Experiment No. | Amount of added carbon black (wt. %) | Amount of added first organic binder (wt. %) | Amount of added organic peroxide (phr) |
|---|---|---|---|
| 1 | 90 | 10 | 2.0 |
| 2 | 70 | 30 | 2.0 |
| 3 | 50 | 50 | 2.0 |

In experiments 1 and 2, the first organic binder is dissolved in a heated solvent so as to set the carbon black at the predetermined wt.%. Subsequently after the solvent has been removed from the polymeric composition, the first organic binder remaining on the surface of the carbon black and the carbon black are chemically crosslinked to each other. Then, the composition thus obtained is fractionized, for example, crushed and olefin elastomer acting as a second organic binder is added to the crushed composition such that an electrically conductive polymeric composite finally contains 30 wt.% of the carbon black. A pair of electrodes are formed on the electrically conductive polymeric composite thus obtained and then, the electrically conductive polymeric composite is annealed. An estimation was made as to how the resistance value between the electrodes formed on the electrically conductive polymeric composite changes thermally. This estimation revealed that there is no noticeable thermal deterioration of the resistance value of the electrically conductive polymeric composite even after the electrically conductive polymeric composite has been exposed to a temperature of 100° C. for 7,500 hr.

Meanwhile, comparative experiments were performed in comparison with the experiments of the present invention. In the comparative experiments, carbon black has been heat treated at 900° C. for three hours so as to lower its resistance value and slightly reduce the functional groups on the surface. Meanwhile, high-density polyethylene containing no functional groups and having a high crystallinity is employed as a polymer. The functional groups of the carbon black are slightly decreased in number by the above described heat treatment and the carbon black is not subjected to treatment with vinyl silane. By using such polyethylene and carbon black, compositions having the percentage compositions of Table 2 below were obtained.

TABLE 2

| Comparative experiment No. | Amount of added carbon black (wt. %) | Amount of added first organic binder (wt. %) |
|---|---|---|
| 1 | 90 | 10 |
| 2 | 70 | 30 |
| 3 | 50 | 50 |

In the comparative experiments 1 to 3, a pair of electrodes are formed on the composite thus obtained and then, the composite formed with the electrodes is annealed. Subsequently, in the same manner as in experiments 1 to 3 of Table 1, an estimation was made as to how the resistance value between the electrodes changes thermally. The estimation showed that the resistance value increases probably due to cohesion of the carbon black at the time when the composite had been exposed to a temperature of 100° C. for 2,000 hr.

Meanwhile, in the case where the sample employs polyethylene into which functional groups are not introduced, improper electrical conduction is established between the sample and the electrodes, thereby making it impossible to obtain effective data. It seems that the functional group greatly contributes toward the improvement of the adhesive properties with respect to not only the electrodes but the substrate or the like.

Since the annealing process is performed after the crosslinking process in the experiments of the present invention, it will seem unnecessary to perform the annealing process. However, when the composite is annealed above the melting point of the olefin elastomer, the resistance value dropped sharply. Namely, it was found that the annealing process adjusts the orientation of the particles of the polyethylene and the carbon black dispersed in the olefin elastomer so as to cause stable cohesion of the particles and therefore, is a process essential for producing the electrically conductive polymeric composite.

As is clear from the foregoing description, in the method of the present invention, after the polymer and the carbon black each having functional groups have been crosslinked to each other easily, the crosslinked composition is dispersed in the polymer enabling fractionization and then, is annealed, whereby an electrically conductive polymeric composite having a stable resistance value is obtained without a need for performing the crosslinking process at the final step, such as irradiation with electron rays, etc.

Accordingly, in accordance with the present invention, a layer having another function and susceptible to electron rays can be integrally formed with the electrically conductive polymeric composite.

Furthermore, in accordance with the present invention, it becomes possible to improve the flexibility, elasticity, rigidity, etc. of the electrically conductive polymeric composite by properly selecting the second polymer.

Although the present invention has been fully described herein, it should be noted that various changes and modifications can be made which are apparent to those skilled in the art. Therefore, unless otherwise such changes and modifications depart from the scope of the present invention, they should be construed as being included therein.

What is claimed is:

1. A method of making an electrically conductive polymeric composite, comprising the steps of:
   kneading a polymeric binder with carbon black into an electrically conductive composition, both the polymeric binder and the carbon black containing functional groups capable of crosslinking with each other and wherein the carbon black occupies about 30 to 90% by weight of the electrically conductive composition;
   crosslinking the electrically conductive composition to affix the carbon black to the polymeric binder by means of an organic peroxide or by irradiation with electron rays;
   fractionalizing the electrically conductive composition into a powdery electrically conductive composition;
   kneading the powdery electrically conductive crosslinked composition with a molding material into a moldable composition;
   molding the moldable composition such that the moldable composition has a predetermined shape; and
   annealing the moldable composition at a temperature equal to or higher than the softening temperature of the molding material.

2. A method as claimed in claim 1, wherein the polymeric binder is a polyolefin composition which contains a crystalline component having a crystallinity of not less than 20 percent by X-ray analysis.

3. A method as claimed in claim 1, wherein the molding material is a thermoplastic rubber.

4. A method as claimed in claim 2, wherein the molding material is an olefin series thermoplastic rubber.

5. A method as claimed in claim 1, wherein functional groups are introduced into the carbon black by means of a silane coupling agent diluted in a solvent and then agitated and dried together with the carbon black so as to coat the surface of the carbon black.

6. A method as claimed in claim 2, wherein functional groups are introduced into the carbon black by means of a silane coupling agent diluted in a solvent and then agitated and dried together with the carbon black so as to coat the surface of the carbon black.

7. A method as claimed in claim 1, wherein the carbon black occupies not more than 90 weight percent of the electrically conductive composition.

8. A method as claimed in claim 1 in which the electrically conductive powder has an average particle diameter of not more than 200 microns.

9. A method of making an electrically conductive polymeric composite, comprising the steps of:
   kneading a polymeric binder with carbon black into an electrically conductive composition, both the polymeric binder and the carbon black containing functional groups capable of crosslinking with each other and wherein the carbon black occupies about 30 to 90% by weight of the electrically conductive composition;
   crosslinking the electrically conductive composition to affix the carbon black to the polymeric binder by means of an organic peroxide or by irradiation with electron rays;
   fractionalizing the electrically conductive composition into a powdery electrically conductive composition;
   kneading the powdery electrically conductive crosslinked composition with a molding material into a moldable composition;
   molding the moldable composition such that the moldable composition has a predetermined shape;
   mounting a pair of electrodes on the moldable composition; and
   annealing the moldable composition at a temperature equal to or higher than the softening temperature of the molding material.

10. A method as claimed in claim 9, wherein the polymeric binder is a polyolefin composition which contains a crystalline component having a crystallinity of not less than 20 percent by X-ray analysis.

11. A method as claimed in claim 9, wherein the molding composition is a thermoplastic rubber.

12. A method as claimed in claim 10, wherein the molding composition is an olefin series thermoplastic rubber.

13. A method as claimed in claim 9, wherein a silane coupling agent is diluted in a solvent and then is agitated and dried together with the carbon black so as to be coated on a surface of the carbon black.

14. A method claimed as in claim 9, wherein functional groups are introduced into the carbon black by means of a silane coupling agent diluted in a solvent and then agitated and dried together with the carbon black so as to coat the surface of the carbon black.

15. A method as claimed in claim 9, wherein the electrically conductive powder has an average particle diameter of not more than 200 microns.

16. An electrically conductive polymeric composite produced according to claim 10 in which the carbon black occupies 25–50 percent of the electrically conductive composite.

17. An electrically conductive polymeric composite produced according to claim 9 in which the carbon black occupies 25–50 percent of the composite.

* * * * *